May 30, 1933.  F. T. ATCHISON  1,911,257
POULTRY FEEDER
Filed Aug. 14, 1931
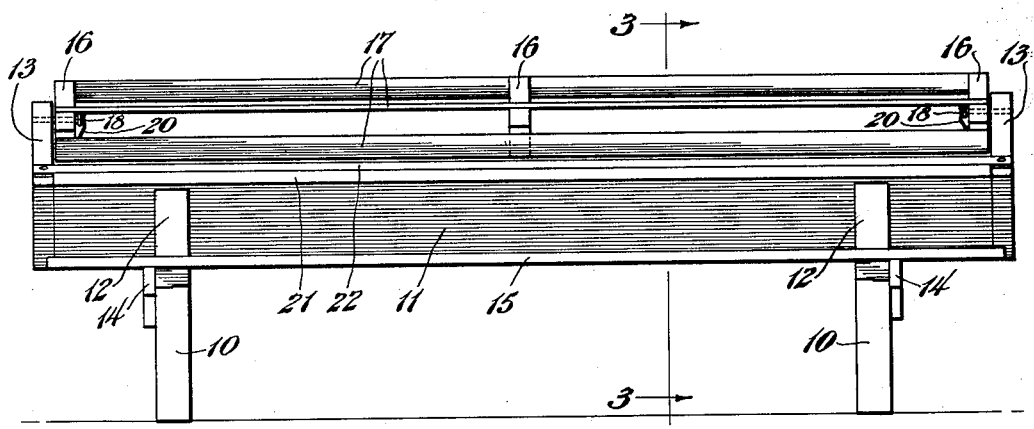
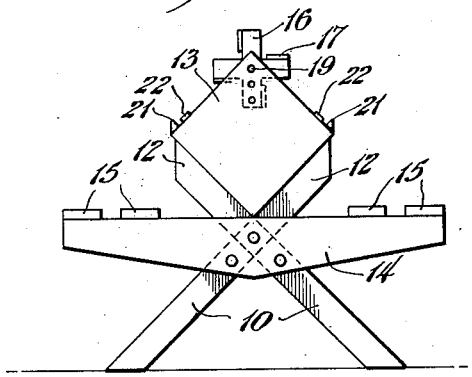
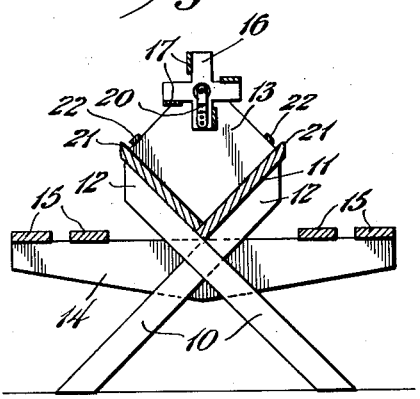
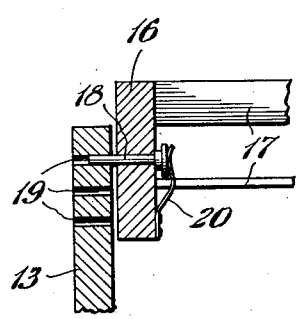
INVENTOR
F. T. Atchison
BY A. D. Adams
ATTORNEY Patented May 30, 1933

1,911,257

UNITED STATES PATENT OFFICE

FRANK T. ATCHISON, OF STOCKTON, ILLINOIS

POULTRY FEEDER

Application filed August 14, 1931. Serial No. 557,173.

This invention relates to poultry feeders and aims to provide an improved, relatively inexpensive sanitary and durable feed trough having an adjustable guard to prevent poultry of different sizes from lighting on the trough and contaminating the food therein. Also, the invention provides a novel support and perch for the trough.

Other aims and advantages will appear from the specification, when considered in connection with the accompanying drawing, wherein:—

Fig. 1 is a side elevation of the preferred form of trough;

Fig. 2 is an end view;

Fig. 3 is a sectional view taken on the line 3—3 in Fig. 1; and

Fig. 4 is a fragmentary sectional view showing how the guard is supported on the trough.

Referring particularly to the drawing, the feed trough there shown is mounted on a pair of crossed, wooden legs 10 which are mortised or notched where they are joined so that the two legs of each pair lie in the same plane. A wooden trough 11 is made V-shaped to fit in the upper extensions 12 of the legs. The trough has end walls 13 preferably made of square pieces of boards so that the upper corners extend above the level of the trough.

To brace the legs and to provide perches on opposite sides of the trough, a horizontal cross member or board 14 is secured to the outer face of each pair of legs and longitudinal slats 15 are nailed or otherwise secured to the upper edges of the boards. Thus, the slats provide perches at the proper height for chickens or poultry to stand upon them and eat out of the trough.

To prevent the fowls from lighting on the trough and contaminating the contents, there is shown a revolving guard composed of wooden spiders 16 carrying longitudinal slats 17, one of the spiders being arranged at each end of the guard. The end spiders or supports for the slats have central apertures or openings carrying pivot pins or axles 18 which extend through or into pairs of alined openings 19 arranged in a spaced vertical series in the end walls 13. The pins or axles 18 are normally urged outwardly by means of springs such as the leaf springs 20 secured to the inner faces of the end spiders, Fig. 4, the arrangement being such that the pins may be grasped and pulled inwardly to disengage them from their bearing openings in the end walls of the trough. The series of bearing openings 19 are provided to enable the revolving guard to be adjusted vertically so as to prevent chickens or fowls of different sizes from lighting on the opposite edges of the trough. In other words, the guard can be so adjusted as to enable relatively small fowls to reach into the trough and at the same time prevent them from jumping in between the slats and the opposite side edges of the trough. When the trough is used to feed full grown fowls, the guard will be mounted in the uppermost pair of bearing openings. It will, of course, be apparent that if any fowl lights on the guard, the guard will rotate and throw it off.

To prevent the fowl from wasting the food, the opposite side edges of the trough are shown as having bevelled edges or lips 21 and narrow strips or bars 22 are secured to the end wall and slightly spaced from the lips on each side. These strips and the lips will cause the food that tends to be thrown out of the trough to fall back into it. Thus, very little of the food will be thrown out of the trough and on the ground while the fowls are eating.

Obviously, the present invention is not restricted to the particular embodiment thereof herein shown and described.

What I claim is:—

1. A poultry feeder comprising, in combination, a trough having end and side walls; the end walls on the trough extending above the level of the side walls; said end walls having a series of vertically spaced bearing openings; and a rotatable guard having outwardly projecting, spring-urged pins removably mounted in a pair of said openings whereby the guard may be adjusted to prevent fowls of different sizes from entering the trough.

2. In a poultry feeder of the class described, a substantially V-shaped wooden trough having end walls and side walls, the side walls having bevelled upper edges providing lips; narrow strips secured to the end walls of the trough and lying adjacent to the lips to catch food and prevent it from being thrown out of the trough; a support for the trough; and perches secured to the support on opposite sides of the trough.

In testimony, that I claim the foregoing as my own, I have hereto affixed my signature.

FRANK T. ATCHISON.